(12) United States Patent
Cafiero et al.

(10) Patent No.: US 9,935,714 B2
(45) Date of Patent: Apr. 3, 2018

(54) BIDIRECTIONAL OPTICAL TRANSCEIVER

(71) Applicant: Cisco Technology, Inc., San Jose, CA (US)

(72) Inventors: Luca Cafiero, Palo Alto, CA (US); Franco Tomada, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/352,439

(22) Filed: Nov. 15, 2016

(65) Prior Publication Data

US 2017/0063459 A1 Mar. 2, 2017

Related U.S. Application Data

(63) Continuation of application No. 14/557,326, filed on Dec. 1, 2014, now Pat. No. 9,515,740.

(51) Int. Cl.
*H04B 10/40* (2013.01)
*H04J 14/02* (2006.01)
*G02B 6/42* (2006.01)
*H04B 10/2581* (2013.01)

(52) U.S. Cl.
CPC .......... *H04B 10/40* (2013.01); *G02B 6/4246* (2013.01); *G02B 6/4284* (2013.01); *H04J 14/02* (2013.01); *H04B 10/2581* (2013.01)

(58) Field of Classification Search
None
See application file for complete search history.

(56) References Cited

U.S. PATENT DOCUMENTS

| 9,172,578 B1 | 10/2015 | Dabiri |
| 9,515,740 B2 | 12/2016 | Cafiero et al. |
| 2004/0161240 A1 | 8/2004 | Weber |
| 2005/0019036 A1* | 1/2005 | Soto ........................ H04J 14/02 398/135 |
| 2005/0157461 A1 | 7/2005 | Cauthron |
| 2010/0329669 A1* | 12/2010 | Cunningham ......... H04B 10/40 398/41 |
| 2011/0069966 A1* | 3/2011 | Kato ...................... H04B 10/40 398/136 |

(Continued)

OTHER PUBLICATIONS http://www.dictionary.com/browse/allocate.*

(Continued)

*Primary Examiner* — David Payne
*Assistant Examiner* — Casey Kretzer
(74) *Attorney, Agent, or Firm* — Polsinelli PC

(57) ABSTRACT

An apparatus, system and method for facilitating higher bandwidth communication in a data center using existing multi-mode fibers. A first transceiver within a first device transmits Ethernet traffic to a second device over first and second optical fibers and receives return optical signals over the same first and second optical devices. By varying the wavelengths between the transmitted and received optical signals, the same optical fibers can be used to both transmit and receive optical signals. A second transceiver within the same housing as the first transceiver performs the same function. In this fashion, one device can be coupled to four bidirectional optical fibers, each transmitting and receiving optical signals at 20 Gbps.

20 Claims, 4 Drawing Sheets

(56) References Cited

U.S. PATENT DOCUMENTS

| 2013/0077920 | A1* | 3/2013 | Matsue | G02B 6/4277 |
| | | | | 385/92 |
| 2013/0223484 | A1 | 8/2013 | Tang et al. | |
| 2014/0314425 | A1 | 10/2014 | Cafiero | |
| 2015/0288449 | A1 | 10/2015 | Coffey et al. | |
| 2015/0311997 | A1 | 10/2015 | Boyd | |

OTHER PUBLICATIONS

Chris Cole, Finisar Corp., "Beyond 1000 Client Optics," IEEE Communications Magazine, IEEE Service Center, Piscataway, US, vol. 50, No. 2, Feb. 1, 2012 in 10 pages.

Rev et al., "QSFP28 4X Base Electrical Specification SFF-8679 Specification for QSFP28 4X Base Electrical Specification," Aug. 12, 2014, XP055251883, Retrieved from the Internet: URL:ftp://ftp.seagate.com/sff/SFF-8679. PDF in 12 pages.

Notification of Transmittal of the International Search Report and the Written Opinion of the International Search Authority, or the Declaration dated Mar. 10, 2016 in PCT Application No. PCT/US2015/063030 in 12 pages.

\* cited by examiner

BIDIRECTIONAL OPTICAL TRANSCEIVER

CROSS-REFERENCE TO RELATED APPLICATIONS

This application is a Continuation of U.S. application Ser. No. 14/557,326, filed Dec. 1, 2014, entitled "2×40 GBPS BIDI OPTICAL TRANSCEIVER," which is incorporated herein by reference in its entirety.

TECHNICAL FIELD

The present disclosure relates to optical communications for improving bandwidth in fiber optic networks using existing multi-mode optical fibers.

BACKGROUND

Currently, legacy data centers are built to accommodate a link speed of 10 Gigabytes per second (Gbps) for transmission of Ethernet data over optical fibers. However, each fiber is actually capable of handling 20 Gbps. There is currently a market transition to change the link speed from 10 Gbps Ethernet to 40 Gbps Ethernet in the data center.

BRIEF DESCRIPTION OF THE DRAWINGS

There are shown in the drawings embodiments that are presently preferred it being understood that the disclosure is not limited to the arrangements and instrumentalities shown, wherein.

DESCRIPTION OF EXAMPLE EMBODIMENTS

Figure 1:
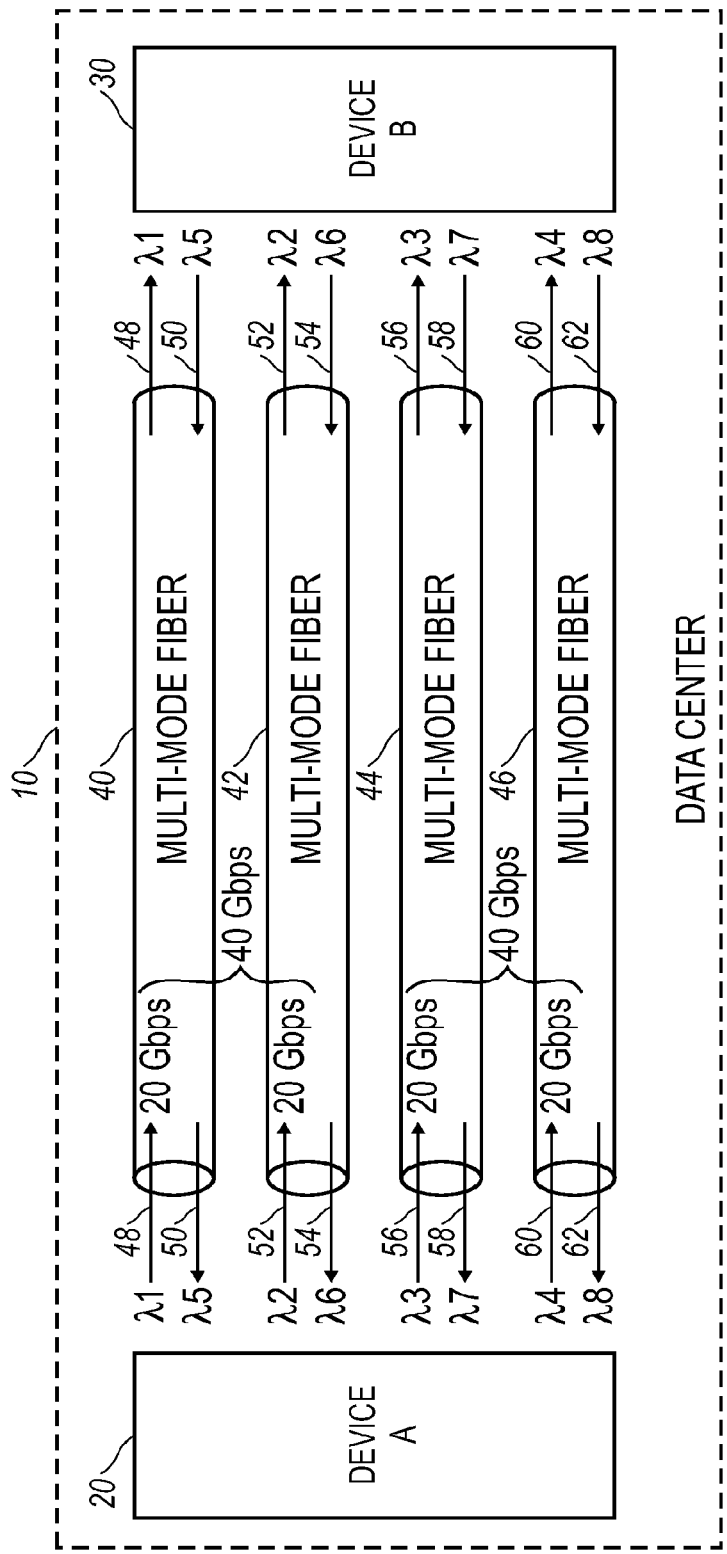
FIG. 1 illustrates a full-duplex communication of Ethernet traffic over four multi-mode optical fibers between first and second devices incorporating the principles of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

In one aspect of the present disclosure, an apparatus is provided, where the apparatus includes an electrical interface for receiving a predetermined bandwidth of Ethernet traffic, an optical interface for receiving a plurality of optical fibers, a modem configured to allocate the received predetermined bandwidth of Ethernet traffic into first and second optical portions, a first optical transceiver configured to transmit, via the optical interface, the first optical portion of Ethernet traffic over a first optical fiber at a first wavelength and over a second optical fiber at a second wavelength, and a second optical transceiver configured to transmit, via the optical interface, the second optical portion of the Ethernet traffic over a third optical fiber at a third wavelength and over a fourth optical fiber at a fourth wavelength.

In another aspect, a system is provided, the system including a first device, a second device, and a plurality of optical fibers coupled between the first device and the second device. The first device includes a modem configured to allocate a predetermined bandwidth of Ethernet traffic into first and second optical portions, a first optical transceiver configured to transmit the first optical portion of the predetermined bandwidth of Ethernet traffic over a first optical fiber of the plurality of optical fibers at a first wavelength and over a second optical fiber of the plurality of optical fibers at a second wavelength, and a second optical transceiver configured to transmit the second optical portion of the predetermined bandwidth of Ethernet traffic over a third optical fiber of the plurality of optical fibers at a third wavelength and over a fourth optical fiber of the plurality of optical fibers at a fourth wavelength.

In yet another aspect of the present disclosure, a method is provided where the method includes, transmitting, from a first device to a second device, a first portion of a predetermined bandwidth of Ethernet traffic over a first optical fiber at a first wavelength and over a second optical fiber at a second wavelength, receiving, by the first device from the second device, a first return optical signal over the first optical fiber at a wavelength different from the first wavelength and a second return optical signal over the second optical fiber at a wavelength that is different from the second wavelength, transmitting, from the first device to the second device, a second portion of the predetermined bandwidth of Ethernet traffic over a third optical fiber at a third wavelength and over a fourth optical fiber at a fourth wavelength, and receiving, by the first device from the second device, a third return optical signal over the third optical fiber at a wavelength that is different from the third wavelength and a fourth return optical signal over the fourth optical fiber at a wavelength that is different from the fourth wavelength.

DETAILED DESCRIPTION

In order to accommodate the previously mentioned market transition to change the link speed from 10 Gbps Ethernet in the data center, the existing fiber would need to be replaced. Changing the fibers is a costly process for data centers, particularly large data centers where labor costs and material costs would make the transition an exorbitant and perhaps cost-prohibitive undertaking. The present disclosure describes an apparatus and method for improved bandwidth capabilities in a data center using existing fiber optic fibers. FIG. 1 illustrates a high-level diagram of an optical communication system in a data center 10. In the optical communication system, network traffic, for example, Ethernet traffic, is communicated between a first device 20 and a second device 30, denoted in FIG. 1 as Device A and Device B, respectively. A plurality of optical fibers are coupled to each of device 20 and device 30 in order to carry optical signals between the two devices.

According to the example shown in FIG. 1, each of four multi-mode fibers, 40, 42, 44, and 46 carries a portion of a predetermined bandwidth of Ethernet traffic in the form of optical signals between device 20 and device 30. In one example, optical fibers 40 and 42 carry a first portion of the predetermined bandwidth of Ethernet traffic from device 20 to device 30 and optical fibers 44 and 46 carry a second portion of the predetermined bandwidth of Ethernet traffic from device 20 to device 30. In one example, optical fiber 40 carries a first optical signal 48 at a first wavelength λ1 from device 20 to device 30. Optical fiber 42 carries a second optical signal 52 at a second wavelength λ2 from device 20 to device 30. Optical fiber 44 carries a third optical signal 56 at a third wavelength λ3 from device 20 to device 30. Optical fiber 46 carries a fourth optical signal 60 at a fourth wavelength λ4 from device 20 to device 30.

Optical fibers 40, 42, 44, and 46 can be full-duplex fibers, capable of transmitting and receiving optical signals in the same fiber. This is accomplished due to the differences in wavelengths between the transmitted optical signals. For example, optical fiber 40 can carry a first return optical signal 50 from device 30 to device 20 having a fifth wavelength λ5 that is different from the first wavelength λ1, thus allowing both first optical signal 48 and first return optical signal 50 to be carried by the same fiber, i.e., optical fiber 40.

Similarly, optical fiber 42 can carry a second return optical signal 54 from device 30 to device 20 having a sixth wavelength λ6 that is different from the second wavelength λ2, thus allowing both the second optical signal 52 and the second return optical signal 54 to be carried by the same fiber, i.e., optical fiber 42. Optical fiber 44 can carry a third return optical signal 58 from device 30 to device 20 having a seventh wavelength λ7 that is different from wavelength λ3, thus allowing both the third optical signal 56 and the third return optical signal 58 to be carried by the same fiber, i.e., fiber 44. Finally, optical fiber 46 can carry a fourth return optical signal 62 from device 30 to device 20 having an eighth wavelength λ8 that is different from the fourth wavelength λ4, thus allowing both the fourth optical signal 60 and the fourth return optical signal 62 to be carried on the same fiber, i.e., fiber 46.

Figure 2:
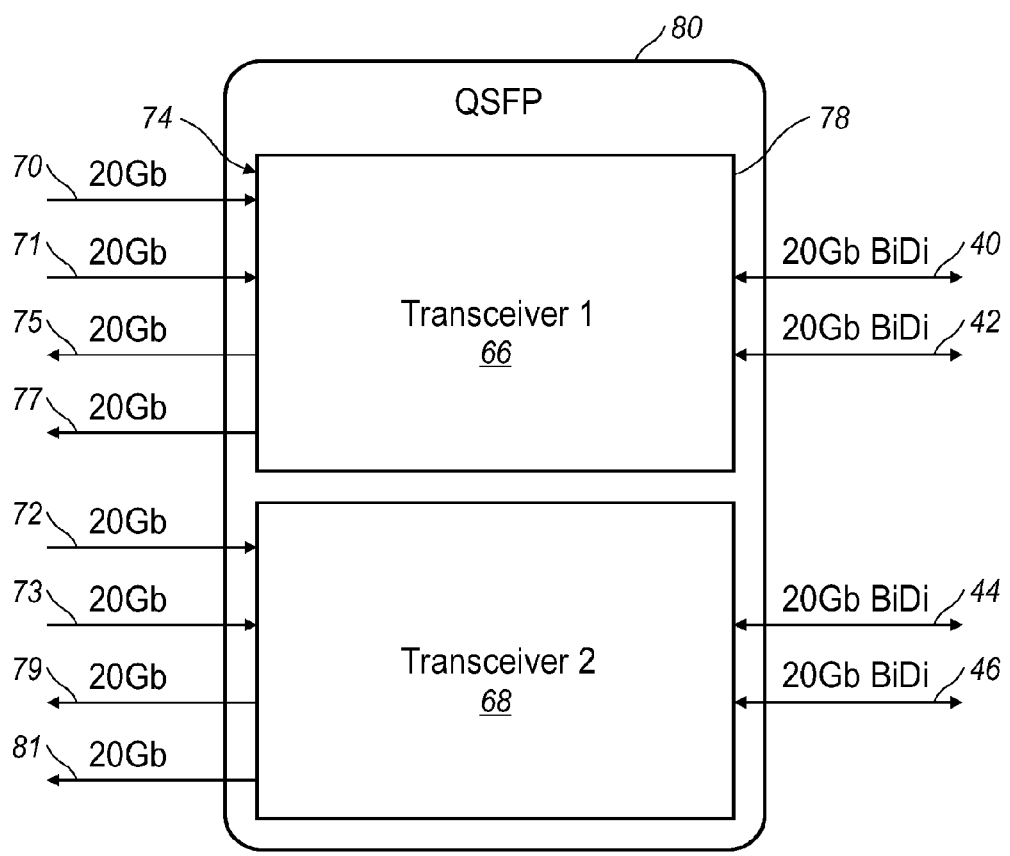
FIG. 2 is a block diagram of a QSFP module used in connection with the present disclosure.

FIG. 2 illustrates an example of the present disclosure where device 20 is a Quad Small Form-factor Pluggable (QSFP) module 80. QSFP module 80 can house transceiver 1 66 and transceiver 2 68. Transceiver 1 66 and transceiver 2 68 each include the necessary components, including modems, to convert the incoming electrical signals of the Ethernet traffic to optical signals for transmission over optical fibers 40, 42, 44, and 46 and to convert incoming optical signals from an optical fiber back into electronic signals, as is known in the art. QSFP 80 also includes an electrical interface 74 that receives electrical signals and an optical interface 78 that receives a plurality of optical fibers. Note that the use of QSFP module 80 to house the electrical components of device 20 is merely exemplary and other modules or housings may be used. Ethernet traffic in the form of electrical signals is received by QSFP module 80 at electrical interface 74 and these signals converted into optical signals and transmitted along full-duplex optical cables 40, 42, 44, and 46 in the manner described above.

Using the techniques illustrated in FIG. 1, QSFP 80 receives a predetermined bandwidth of Ethernet traffic in the form of electrical signals that is to be sent to second device 30. In one example, a predetermined bandwidth of Ethernet traffic is 80 Gbps and the first portion of predetermined bandwidth of Ethernet traffic allocated to transceiver 1 66 is 40 Gbps and the second portion of Ethernet traffic allocated to transceiver 2 68 is 40 Gbps. In this example, electrical signals are received at electrical interface 74 of QSFP module 80 along links 70 and 71 at 20 Gb per link. Transceiver 1 66 converts these electrical signals, which form the first portion of the predetermined bandwidth of Ethernet traffic, to optical signals which are transmitted at optical interface 78 over optical links 40 and 42 to device 30 at 20 Gb per link. Similarly, electrical signals are received at electrical interface 74 of QSFP module 80 along links 72 and 73 at 20 Gb per link. Transceiver 2 68 converts these electrical signals, which form the second portion of the predetermined bandwidth of Ethernet traffic, to optical signals which are transmitted at optical interface 78 over optical links 44 and 46 to device 30 at 20 Gb per link.

Incoming optical signals from device 30 over links 40 and 42 are converted back to electrical signals by transceiver 1 66 and, in one example, transmitted to other devices along links 75 and 77 via electrical interface 74 at 20 Gb per link. Similarly, incoming optical signals over links 44 and 46 are converted back to electrical signals by transceiver 2 68 and, in one example, transmitted to other devices along links 79 and 81 via electrical interface 74 at 20 Gb per link.

Figure 3:
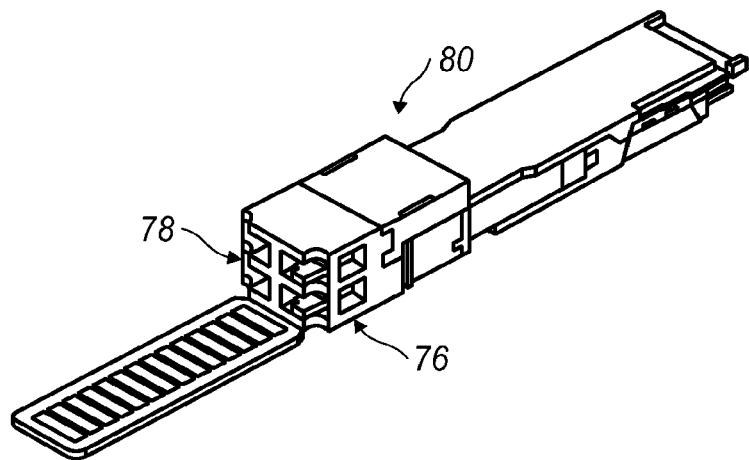
FIG. 3 illustrates a perspective view of the QSFP module housing.
Figure 4:
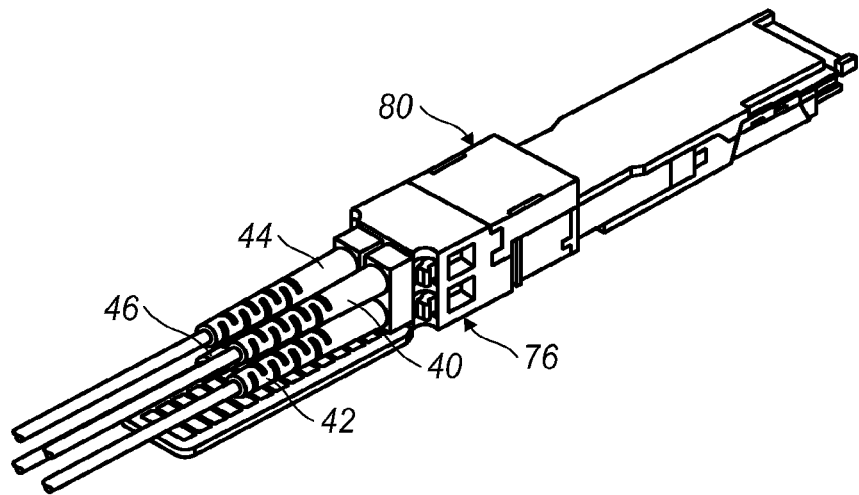
FIG. 4 illustrates a perspective view of the QSFP module housing coupled to four optical fibers.

FIGS. 3 and 4 illustrate QSFP module 80 which, as described in greater detail above, includes modem 64 and transceivers 66 and 68 such that signals received by QSFP module 80 at its electrical interface 74 are converted to optical signals in the manner described above and transmitted to another device, i.e., device 30. As shown in FIG. 3, optical interface 78 of device 20 includes four ports, each port configured to receive an optical fiber. Advantageously, a single QSFP module 80 is used to house transceivers 66 and 68, and which via its optical interface 78, is able to couple to four optical fibers in order to transmit and receive optical signals. In certain embodiments QSFP module 80 can include an optical interface 78 that can receive more or less than four optical cables. The dimensions of QSFP module 80 can be modified accordingly in order to house the electrical components including modem 64, transceiver A 66 and transceiver B 68 and its optical interface 78 configured to receive two pairs of optical fibers, i.e., a first pair of optical fibers (optical fibers 40 and 42) and a second pair of optical fibers (optical fibers 44 and 46) as shown in FIG. 4. QSFP module 80 can also include one or more heat sinks to safely account for heat dissipation due to the modified size of QSFP 80.

Figure 5:
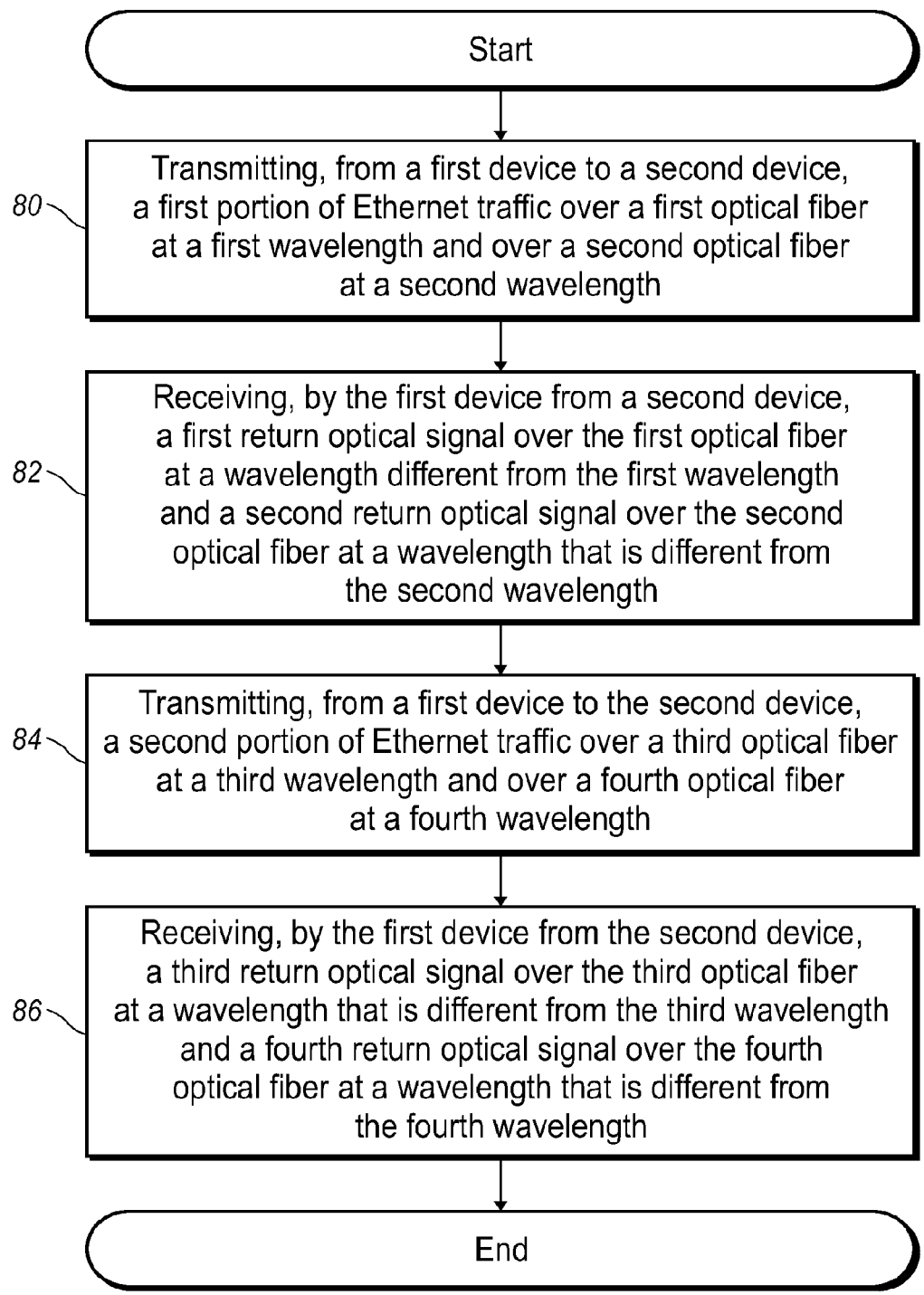
FIG. 5 illustrates a flowchart depicting steps taken by an example of the present disclosure.

FIG. 5 is a flowchart showing the interaction between first device 20 and second device 30 utilizing the principles of the present disclosure. At step 80, first device 20 transmits to a second device 30, a first portion of a predetermined bandwidth of Ethernet traffic, the first portion including signal 48 transmitted over a first optical fiber 40 at a first wavelength λ1 and signal 52 transmitted over a second optical fiber 42 at a second wavelength λ2. At step 82, first device 20 receives from second device 30, a first return optical signal 50 over the first optical fiber 40 at a wavelength λ5 different from the first wavelength λ1 and a second return optical signal 54 over the second optical fiber 42 at a wavelength λ6 that is different from the second wavelength λ2.

Continuing to refer to FIG. 5, at step 84, first device 20 transmits to second device 30, a second portion of the predetermined bandwidth of Ethernet traffic, the second portion including signal 56 transmitted over a third optical fiber 44 at a third wavelength λ3 and including signal 60 transmitted over a fourth optical fiber at a fourth wavelength λ4. At step 86, first device 20 receives from second device 30, a third return optical signal 58 over the third optical fiber 44 at a wavelength λ7 that is different from the third wavelength λ3 and a fourth return optical signal 62 over the fourth optical fiber 46 at a wavelength λ8 that is different from the fourth wavelength λ4.

The present disclosure provides techniques for facilitating higher bandwidth in a data center using multi-mode fibers and full-duplex optical communications. Specifically, the present disclosure describes methods for compressing two bidirectional transceivers within a single module, i.e., a QSFP module. Combining transceivers in this fashion improves integration of the electronic components therein and reduces the overall data center/enterprise network switch footprint.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The specification and drawings are, accordingly, to be regarded in an illustrative rather than a restrictive sense. It will, however, be evident that various modifications and changes may be made thereunto without departing from the broader spirit and scope of various aspects of the disclosure as set forth in the claims.

What is claimed is:

1. An apparatus comprising:
an electrical interface for receiving a predetermined bandwidth of Ethernet traffic; a Quad Small Form-Factor Pluggable (QSFP) optical interface configured to provide a bidirectional data interface over a plurality of optical fibers;
a modem configured to allocate the predetermined bandwidth of Ethernet traffic into a first portion and a second portion; and
a first optical transceiver configured to transmit, via the QSFP optical interface, the first portion of Ethernet traffic over a first optical fiber at a first wavelength and over a second optical fiber at a second wavelength;
wherein the first optical fiber is configured to bidirectionally carry two wavelengths of light, the second optical fiber is configured to bidirectionally carry two wavelengths of light different than the first optical fiber.

2. The apparatus of claim 1, further comprising:
a second optical transceiver configured to transmit, via the QSFP optical interface, the second portion of the Ethernet traffic over a third optical fiber at a third wavelength and over a fourth optical fiber at a fourth wavelength.

3. The apparatus of claim 1, wherein the first optical transceiver is further configured to:
receive a first return optical signal over the first optical fiber at a wavelength different from the first wavelength; and
receive a second return optical signal over the second optical fiber at a wavelength that is different from the second wavelength, and wherein the second optical transceiver is further configured to receive a third return optical signal over the third optical fiber at a wavelength that is different from the third wavelength and receive a fourth return optical signal over the fourth optical fiber at a wavelength that is different from the fourth wavelength.

4. The apparatus of claim 1, wherein the predetermined bandwidth of Ethernet traffic is 80 Gbps.

5. The apparatus of claim 1, wherein the first portion and the second portion of the predetermined bandwidth of Ethernet traffic are each 40 Gbps.

6. The apparatus of claim 1, wherein the electrical interface receives the predetermined bandwidth of Ethernet traffic over two links, each link configured for carrying a signal at 20 Gbps.

7. A system comprising:
a first device;
a second device; and
a plurality of optical fibers coupled between the first device and the second device; the first device comprising:
a modem configured to allocate a predetermined bandwidth of Ethernet traffic into first and second portions; and
a first optical transceiver configured to transmit the first portion of the predetermined bandwidth of Ethernet traffic over a first optical fiber of the plurality of optical fibers at a first wavelength and over a second optical fiber of the plurality of optical fibers at a second wavelength;
wherein the first optical fiber is configured to bidirectionally carry two wavelengths of light, the second optical fiber is configured to bidirectionally carry two wavelengths of light different than the first optical fiber.

8. The system of claim 7, further comprising:
a second optical transceiver configured to transmit the second portion of the predetermined bandwidth of Ethernet traffic over a third optical fiber of the plurality of optical fibers at a third wavelength and over a fourth optical fiber of the plurality of optical fibers at a fourth wavelength.

9. The system of claim 8, wherein the first optical transceiver is further configured to receive a first return optical signal over the first optical fiber at a wavelength different from the first wavelength, and receive a second return optical signal over the second optical fiber at a wavelength that is different from the second wavelength, and
wherein the second optical transceiver is further configured to receive a third return optical signal over the third optical fiber at a wavelength that is different from the third wavelength and receive a fourth return optical signal over the fourth optical fiber at a wavelength that is different from the fourth wavelength.

10. The system of claim 7, wherein the predetermined bandwidth of Ethernet traffic is 80 Gbps.

11. The system of claim 7, wherein the first device comprises an electrical interface, the electrical interface receiving the predetermined bandwidth of Ethernet traffic over two links, each link carrying an electrical signal at 20 Gbps.

12. The system of claim 7, further comprising an optical interface configured to receive the plurality of optical fibers, the optical interface including four ports, each of the four ports configured to receive one of the plurality of optical fibers.

13. The system of claim 7, further comprising a heat sink configured to dissipate heat away from at least one of the first device or the second device.

14. A method comprising:
  allocating, with a modem, a received predetermined bandwidth of Ethernet traffic into first and second portions;
  transmitting, from a first device to a second device via a Quad Small Form-Factor Pluggable (QSFP) optical interface, the first portion of the predetermined bandwidth of Ethernet traffic over a first optical fiber at a first wavelength and over a second optical fiber at a second wavelength;
  receiving, by the first device from the second device via the QSFP optical interface, a first return optical signal over the first optical fiber at a wavelength different from the first wavelength and a second return optical signal over the second optical fiber at a wavelength that is different from the second wavelength; and
  transmitting, from the first device to the second device via the QSFP optical interface, the second portion of the predetermined bandwidth of Ethernet traffic over a third optical fiber at a third wavelength and over a fourth optical fiber at a fourth wavelength;

wherein the first optical fiber is configured to bidirectionally carry two wavelengths of light, the second optical fiber is configured to bidirectionally carry two wavelengths of light different than the first optical fiber.

15. The method of claim 14, further comprising:
  receiving, by the first device from the second device via the QSFP optical interface, a third return optical signal over the third optical fiber at a wavelength that is different from the third wavelength and a fourth return optical signal over the fourth optical fiber at a wavelength that is different from the fourth wavelength.

16. The method of claim 14, wherein the predetermined bandwidth of Ethernet traffic is 80 Gbps, and wherein the first portion and the second portion of the predetermined bandwidth of Ethernet traffic are each 40 Gbps.

17. The method of claim 14, wherein the first portion of the predetermined bandwidth of Ethernet traffic transmitted over the first optical fiber and the second optical fiber are each 20 Gbps.

18. The method of claim 14, wherein the second portion of the Ethernet traffic transmitted over the third optical fiber and the fourth optical fiber are each 20 Gbps.

19. The method of claim 14, further comprising receiving, by the first device, the predetermined bandwidth of Ethernet traffic over two links, each link carrying an electrical signal at 20 Gbps.

20. The method of claim 14, further comprising:
  dissipating heat away from at least one of the first device or the second device.

* * * * *